United States Patent
Zhou et al.

(10) Patent No.: US 10,674,159 B2
(45) Date of Patent: Jun. 2, 2020

(54) EFFECTIVE INTRA ENCODING FOR SCREEN DATA

(71) Applicant: Microsoft Technology Licensing, LLC, Redmond, WA (US)

(72) Inventors: You Zhou, Sammamish, WA (US); Chih-Lung Lin, Redmond, WA (US); Ming Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 15/663,160

(22) Filed: Jul. 28, 2017

(65) Prior Publication Data

US 2019/0037219 A1   Jan. 31, 2019

(51) Int. Cl.
| | |
|---|---|
| *H04N 19/159* | (2014.01) |
| *H04N 19/119* | (2014.01) |
| *H04N 19/172* | (2014.01) |
| *H04N 19/88* | (2014.01) |
| *H04N 19/136* | (2014.01) |
| *H04N 19/593* | (2014.01) |
| *H04N 19/51* | (2014.01) |

(52) U.S. Cl.
CPC ......... *H04N 19/159* (2014.11); *H04N 19/119* (2014.11); *H04N 19/136* (2014.11); *H04N 19/172* (2014.11); *H04N 19/593* (2014.11); *H04N 19/88* (2014.11); *H04N 19/51* (2014.11)

(58) Field of Classification Search
CPC ..... H04N 19/159; H04N 19/172; H04N 19/51
USPC .................................................. 375/240.13
See application file for complete search history.

(56) References Cited

U.S. PATENT DOCUMENTS

| | | | |
|---|---|---|---|
| 5,568,200 A | 10/1996 | Pearlstein et al. | |
| 9,071,848 B2 | 6/2015 | Filippini et al. | |
| 9,554,141 B2 | 1/2017 | Yu et al. | |
| 2012/0263241 A1* | 10/2012 | Swenson | H04N 19/172 375/240.26 |
| 2013/0121670 A1 | 5/2013 | Lecomte et al. | |

(Continued)

FOREIGN PATENT DOCUMENTS

EP   3160144 A1   4/2017

OTHER PUBLICATIONS

"International Search Report and Written Opinion Issued in PCT Application No. PCT/US2018/034970", dated Jul. 19, 2018, 14 Pages.

Xu, et al., "On Unification of Intra Block Copy and Inter-picture Motion Compensation", In Proceedings of Joint Collaborative Team on Video Coding (JCT-VC) of ITU-T SG 16 WP 3 and ISO/IEC JTC 1/SC 29/WG 11, 16th Meeting: San Jose, US, Jan. 9, 2014, 14 Pages.

(Continued)

*Primary Examiner* — Jared Walker
(74) *Attorney, Agent, or Firm* — Klarquist Sparkman, LLP

(57) ABSTRACT

Various embodiments of the present technology generally relate to encoding techniques. More specifically, some embodiments relate to encoding techniques for screen data. Intra block copy (IntraBC) using motion compensation within a frame (not between frames) is very useful for encoding data captured from screen. Unfortunately, this tool is not included in most of video coding standards, including the base version of HEVC (i.e., H.265). Various embodiments of the present technology utilize encoding techniques to simulate IntraBC with compliant syntax. For example, embodiments divide a high-resolution frame into smaller areas and then encode these areas independently as if these smaller areas were independent frames.

20 Claims, 7 Drawing Sheets

(56) References Cited

U.S. PATENT DOCUMENTS

| | | | |
|---|---|---|---|
| 2015/0195557 A1* | 7/2015 | Silkin | H04N 19/109 |
| | | | 375/240.16 |
| 2015/0208084 A1 | 7/2015 | Zhu et al. | |
| 2015/0261884 A1 | 9/2015 | Pang et al. | |
| 2015/0264386 A1 | 9/2015 | Pang et al. | |
| 2015/0373357 A1 | 12/2015 | Pang et al. | |
| 2016/0100186 A1 | 4/2016 | Gisquet et al. | |
| 2016/0105670 A1* | 4/2016 | Pang | H04N 19/105 |
| | | | 375/240.16 |
| 2016/0241868 A1 | 8/2016 | Li et al. | |
| 2016/0277761 A1 | 9/2016 | Li et al. | |
| 2016/0360210 A1 | 12/2016 | Xiu et al. | |
| 2017/0070748 A1 | 3/2017 | Li et al. | |
| 2017/0094271 A1* | 3/2017 | Liu | H04N 19/105 |
| 2017/0142418 A1 | 5/2017 | Li et al. | |

OTHER PUBLICATIONS

Kim, et al., "Enhanced Hash-based Intra Block Copy for HEVC Screen Content Coding using Sucessive Elimination Algorithm", In Proceedings of First International Conference on Applications and Systems of Visual Paradigms, Nov. 13, 2016, pp. 50-54.

Zhu, et al., "Hash-Based Block Matching for Screen Content Coding", In Journal of IEEE Transactions on Multimedia, vol. 17, Issue 7, Jul. 2015, pp. 935-944.

Xiao, et al., "Fast Hash-based Inter Block Matching for Screen Content Coding", In Journal of IEEE Transactions on Circuits and Systems for Video Technology, Dec. 22, 2016, pp. 1-14.

Rapaka, et al., "Improved intra-block copy and motion search methods for screen content coding", In Proceedings of SPIE—Applications of Digital Image Processing, vol. 9599, Sep. 22, 2015, 2 pages.

* cited by examiner

FIG. 4

Table 410:

| Name | City | State | Expenses |
|---|---|---|---|
| Andy | Redmond | WA | 100000 |
| Bob | Woodinville | WA | 80000 |
| Sandy | Seattle | WA | 300000 |
| Joe | Bellevue | WA | 200 |
| Alex | Spokane | WA | 8080 |

Table 420A:

| Name | City | State | Expenses |
|---|---|---|---|
| Andy | Redmond | WA | 100000 |

Table 420B:

| Name | City | State | Expenses |
|---|---|---|---|
| Andy | Redmond | WA | 100000 |
| Bob | Woodinville | WA | 80000 |

Table 420E:

| Name | City | State | Expenses |
|---|---|---|---|
| Andy | Redmond | WA | 100000 |
| Bob | Woodinville | WA | 80000 |
| Sandy | Seattle | WA | 300000 |
| Joe | Bellevue | WA | 200 |
| Alex | Spokane | WA | 8080 |

EFFECTIVE INTRA ENCODING FOR SCREEN DATA

BACKGROUND

Modern electronic devices such as computers, tablets, mobile phones, wearable devices, gaming consoles, televisions, and the like have become a common part of modern life. Many of these devices provide for various digital video capabilities. However, processing digital videos within these applications can be a resource intensive task as the video data can quickly become large. For example, in real-time video communications users often prefer higher resolutions and frame rates which can quickly tax computing resources (e.g., processors, network communication components, etc.). In an effort to mitigate this problem, various video coding formats can be employed to compress video data for storage and/or transmission. Examples of common video coding formats include, but are not limited to, H.265 which is also known as high efficiency video coding (HEVC), H.264 which is also known as advanced video coding (AVC), various moving picture experts group (MPEG) coding formats, and the like.

One of the tradeoffs with these various video coding formats is between compression rate and quality. To help compress the data further, while still being able to provide higher quality videos, many video coding techniques may employ various partitioning and prediction-based methods that take advantage of statistical redundancy within the digital video. However, the demands from users of modern electronic devices continue to increase. As such, additional improvements to current encoding techniques are needed.

Overall, the examples herein of some prior or related systems and their associated limitations are intended to be illustrative and not exclusive. Upon reading the following, other limitations of existing or prior systems will become apparent to those of skill in the art.

OVERVIEW

Various embodiments of the present technology generally relate to encoding techniques. More specifically, some embodiments relate to encoding techniques for screen data. Some embodiments encode a frame by multiple subframes. As a result, only a small part of image is encoded in each frame and inter frame prediction can be used to simulate intra block copy. Some embodiments also use a hash-based motion search.

Some embodiments can encode a video source by receiving an initial frame from the video source (e.g., from an application supporting desktop sharing between two or more computing devices). Multiple subframes can then be created from the initial frame. For example, a first subframe can be created that includes only a first portion of the initial frame (e.g., by zeroing data after an identified point). Then, an ordered sequence of multiple subsequent frames can be created that each include successively more of the initial frame than the previous subframe until a final subframe is reached that represents all of the initial frame. In accordance with various embodiments, the number of subframes can be statically set (e.g., five, ten, twelve, etc.) or dynamically selected. For example, the number of subframes may be selected based on the size of the initial frame (e.g., the larger the size, the larger the number of subframes). Similarly, the number of multiple subframes the initial frame will be divided into may be dynamically set based on available computing resources (e.g., memory resources, processing resources, network bandwidth, etc.) or user preferences.

An inter frame prediction encoding technique can then be applied to simulate intra frame block copy within the initial frame. The predication encoding technique can include dividing the first subframe into macroblocks and then creating a motion vector by applying a block matching algorithm to the multiple subsequent subframes. In addition, a prediction error can be calculated between any matching blocks identified by the block matching algorithm. Since the first subframe includes only a portion of the data of the initial frame and the subsequent subframes are encoded using inter frame prediction to effectively simulate intra block copy within the initial frame, the overall size of the encoded initial frame is significantly reduced. Moreover, the decoder need not be changed and simply processes the subframes as if they were originally part of the video source.

Some embodiments can receive an initial frame of a video from a video source representing screen data being presented on a display of a machine. From the initial frame of the video source, multiple subframes can be created that each represent progressively more of the initial frame of the video source (e.g., the first subframe including 1/N of the initial frame, the second subframe including 2/N of the initial frame, . . . , and the last frame including all of the initial frame). The first subframe can be divided into macoblocks. Then, using inter frame prediction, each of the multiple subframes after the first subframe to create an encoded version of the initial frame effectively simulating inter block copy. Subsequent frames from the video source can be encoded inter block prediction.

Embodiments of the present technology also include computer-readable storage media containing sets of instructions to cause one or more processors to perform the methods, variations of the methods, and other operations described herein.

Some embodiments provide for a computing having one or more processors, buffer, a video encoder, and/or a communication module. In accordance with some embodiments, a video encoder can be under control of the one or more processors and configured to retrieve an initial frame of a video source from the buffer. The video source may originate from a screen sharing video from a desktop sharing application running on the computing device. Then, the video encoder can create, from the initial frame of the video source, multiple subframes each representing progressively more of the initial frame of the video source. A first subframe from the multiple subframes can be divided into macoblocks (e.g., having a fixed or variable size). The video encoder can then perform inter frame prediction for each of the multiple subframes remaining to create an encoded version of the initial frame. The communication module can transmit the encoded version of the initial frame to a second computing device.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Embodiments of the present technology will be described and explained through the use of the accompanying drawings in which:

FIG. 4 illustrates an example of an initial frame being divided into multiple subframes according to one or more embodiments of the present technology;

Figure 1:
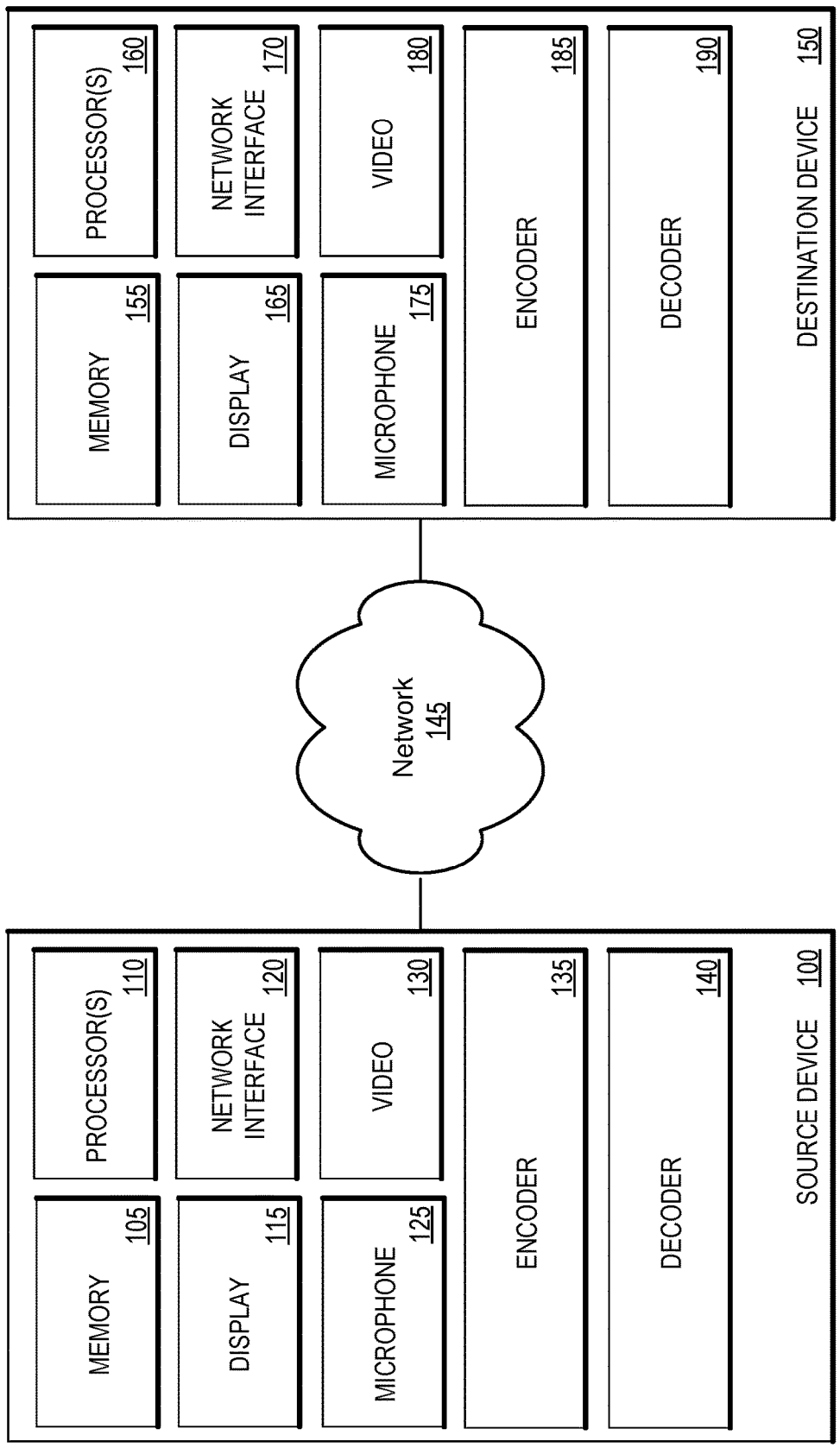
FIG. 1 illustrates an example of an environment in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to encoding techniques. More specifically, some embodiments relate to encoding techniques for encoding screen data. Video encoders used in video based screen sharing were originally designed for natural images, and not for screen data. Encoding screen data is not efficient on most of popular video encoder (e.g., H.264, H.265 vp9, etc.). For example, when encoding a video captured from a screen, the first frame is normally very big and therefore can take a long time to transmit to a receiving device.

In contrast, various embodiments divide a high-resolution frame into smaller areas and then encodes these areas independently as if these smaller areas were independent frames. The bit stream can be multiplexed to reflect this arrangement. For example, some embodiments may simulate intra block copy (e.g., using motion compensation inside a frame) within the H.264 syntax for encoding screen content. Some embodiments encode a frame by using many frames (e.g., 5, 10, 20, or more frames). Only a few macroblock lines may be encoded in a frame. As a result, some embodiments effectively use inter frame prediction to simulate intra frame prediction. Some embodiments may use a hash based motion search, which is designed for screen content motion search, to simulate full range search (e.g., search in whole frame) for all the partition blocks (16×16->4×4). In accordance with various embodiments, a decoder can progressively display the simulated frames or display only the final version of the high-resolution frame.

Various embodiments of the present technology provide for a wide range of technical effects, advantages, and/or improvements to computing systems and components. For example, various embodiments include one or more of the following technical effects, advantages, and/or improvements: 1) reducing the total amount of data needed for video storage and transmission for the first intra frame; 2) automatically dividing a frame into multiple subframes which can then be treated as independent frames for video encoding/decoding; 3) creates a new format for video compression without changing decoding; 4) creates improvements to the way computing devices process digital video; 5) uses unconventional and non-routine operations as part of the video encoding process while leaving decoders unchanged and compliant with current standards (e.g., H.264 or H.265 without Screen Content Coding extension); 6) changes the manner in which a computing system reacts, processes and manages real-time communications that include screen and video data; and/or 7) improve real-time communication user experience by dividing a full frame into smaller subframe each of which is encoded with much small size. Some embodiments also provide an option to display a portion of a frame earlier instead of forcing user to wait for transmitting of whole frame. Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to encoding screen data using video compression technology, embodiments of the present technology are equally applicable to various other instantiations where other compression standards or techniques are utilized.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of an environment in accordance with some embodiments of the present technology. As illustrated in FIG. 1, source device 100 can include multiple components such as memory 105 (e.g., volatile memory and/or nonvolatile memory), processor(s) 110, display 115, network interface 120, microphone 125, video capture device 130, encoder 135, and decoder 140. Source device 100 can be connected via network 145 to destination device 150. Destination device 150 can also include multiple components similar to those in source device 100, such as memory 155, processor(s) 160, display 165, network interface 170, microphone 175, video capture device 180, encoder 185, and decoder 190. Additional components not shown in FIG. 1 such as data storage components (e.g., hard drive, flash memory, memory card, etc.), batteries, keypads or keyboards or other inputs and/or output device may be present.

Figure 7:
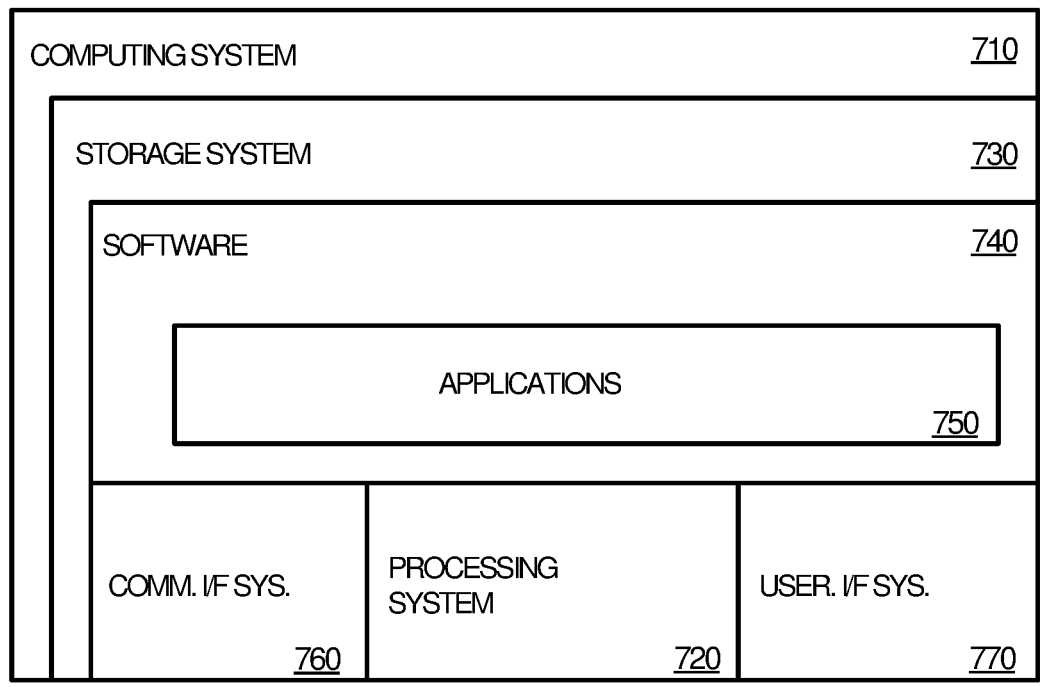
FIG. 7 illustrates an example of a computing system, which is representative of any system or collection of systems in which the various applications, services, scenarios, and processes disclosed herein may be implemented.

Source device 100 and destination device 150 can be any computing system capable of running an application natively or in the context of a web browser, streaming an application, or executing an application in any other manner Examples of source device 100 and destination device 150 include, but are not limited to, personal computers, mobile phones, tablet computers, desktop computers, laptop computers, wearable computing devices, thin client computing devices, virtual and/or augmented reality computing devices, virtual machine hosting a computing environment, distributed application, server computer, computing cluster, application hosted as software as a service (SaaS), application running on a platform as a service (PaaS), application running on an infrastructure as a service (IaaS) or any other form factor, including any combination of computers or variations thereof. One such representative architecture is illustrated in FIG. 7 with respect to computing system 710.

Those skilled in the art will appreciate that various components (not shown) may be included in these devices to enable network communication with communications network 145. In some cases, communications network 145 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Processor(s) 110 and 160 are the main processors of source device 100 and destination device 150 and may include application processors, baseband processors, various coprocessors, and other dedicated processors for the devices. For example, an application processor can provide the processing power to support software applications, memory management, graphics processing, and multimedia. An application processor may be communicably coupled with memory and configured to run the operating system, the user interface, and the applications stored on memory. A baseband processor may be configured to perform signal processing and implement/manage real-time radio transmission operations of the devices. The volatile and nonvolatile memories found in various embodiments may include storage media for storing information such as processor-readable instructions, data structures, program modules, or other data. Some examples of information that may be stored include basic input/output systems (BIOS), operating systems, and applications.

In accordance with various embodiments, encoders 135 and 185 can be configured to operate in one or more encoding modes (e.g., a low-latency encoding mode for real-time communication). Encoders 135 or 185 can receive frames from video source 130 or 180 and produces encoded data as output to a channel Encoder 135 or 185 may store the frames from the video source in a buffer. In some embodiments, the first frame can be divided into multiple subframes and treated as independent frames by encoder 135 or 185 which may apply various filters or other pre-processing techniques before encoding.

An inter frame prediction encoding technique can then be applied to simulate intra frame block copy within the initial frame. The predication encoding technique can include dividing the first subframe into macroblocks and then creating a motion vector by applying a block matching algorithm to the multiple subsequent subframes. In addition, a prediction error can be calculated between any matching blocks identified by the block matching algorithm. Since the first subframe includes only a portion of the data of the initial frame and the subsequent subframes can be encoded using inter frame prediction to effectively simulate intra block copy within the initial frame, the overall size of the encoded initial frame is significantly reduced. Moreover, the decoder need not be changed and simply processes the subframes as if they were originally part of the video source.

In accordance with some embodiments, the encoding may include various processes including dividing or partitioning tiles in to macroblocks, intra prediction estimation and prediction, motion estimation and compensation, frequency transforms, quantization and entropy coding. The exact operations performed by the encoder can vary depending on compression format. Examples of compression formats that may be used in some embodiments of the present technology include, but are not limited to, HEVC format, Windows Media Video format, VC-1 format, MPEG-x format, H.26x format (e.g., H.261, H.262, H.263, H.264), and the like.

Decoder 140 and 190 can be any decoding tool capable of operating in any of multiple decoding modes (e.g., a low-latency decoding mode for real-time communication, etc.). For example, as encoder 135 in source device 100 encodes a video source, the encoded data can be transmitted (e.g., in real-time) to destination device 150 where decoder 190 produces reconstructed frames.

Figure 2:
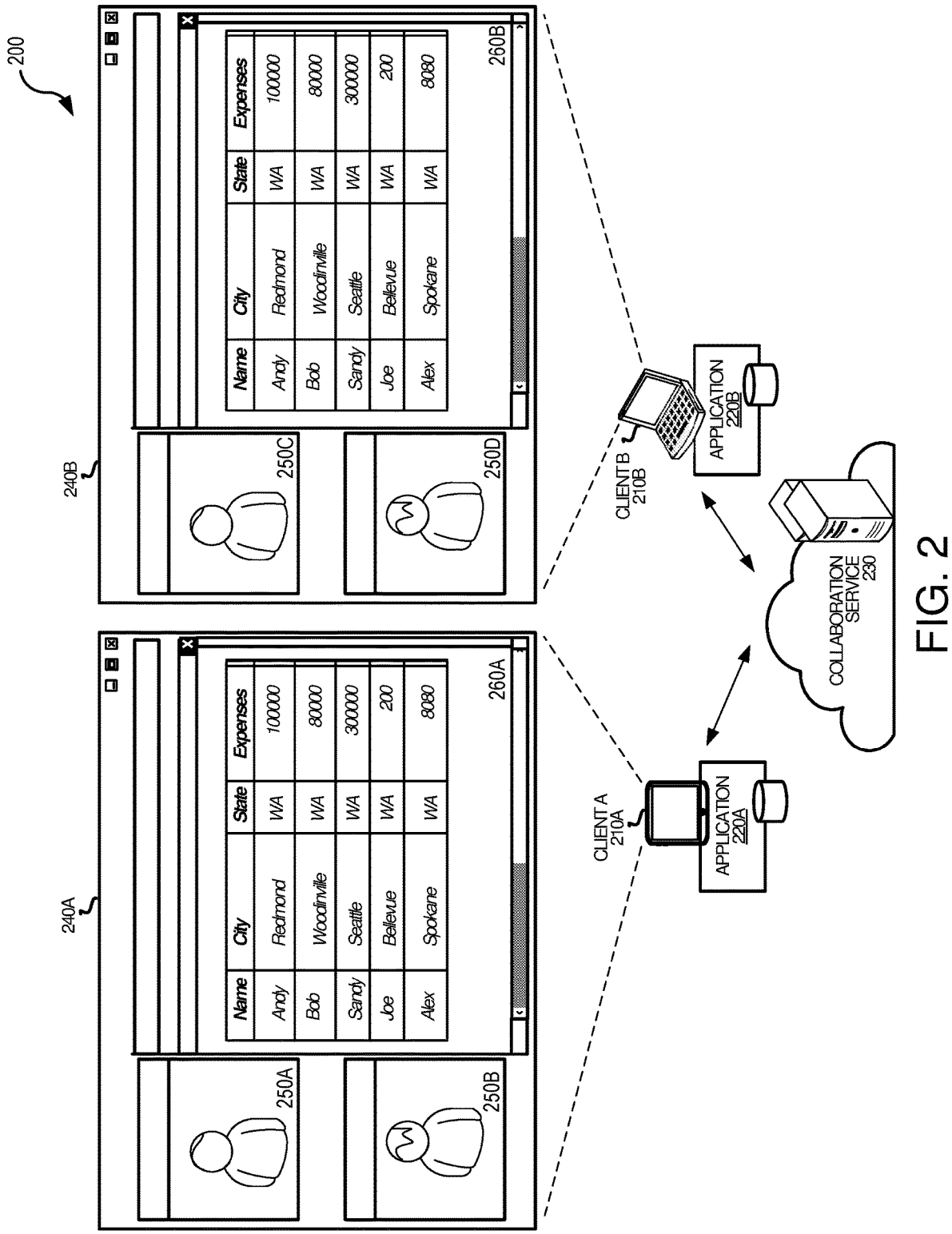
FIG. 2 illustrates an example of cloud-based collaboration system that may use the encoding techniques according to one or more embodiments of the present technology.

FIG. 2 illustrates an example of cloud-based collaboration system that may use the encoding techniques according to one or more embodiments of the present technology. As illustrated in FIG. 2, first client device 210A runs application 220A that can use service 230 to connect client device 210A to client device 210B. Collaboration service 230 can facilitate real-time communications such as video conferencing, desktop sharing, and the like. Applications 220A and 220B may generate graphical user interfaces 240A and 240B to show the live camera feed 250A-250D from client devices 210A-210B. Graphical user interfaces 240A-240B may allow one of the client devices to share a desktop, e.g., for presenting a file, in section 260 of the graphical user interface.

Client devices 210A-20B may include video encoders/decoders that can be used to compress the streaming videos. However, traditional video encoders used in video based screen sharing were originally designed for natural images, and not for screen data. Encoding screen data is not efficient on most of popular video encoder (e.g., H.264, H.265 vp9, etc.). For example, when encoding a video captured from a screen, the first frame is normally very big and therefore can take a long time to transmit from one client device to another.

Figure 3:
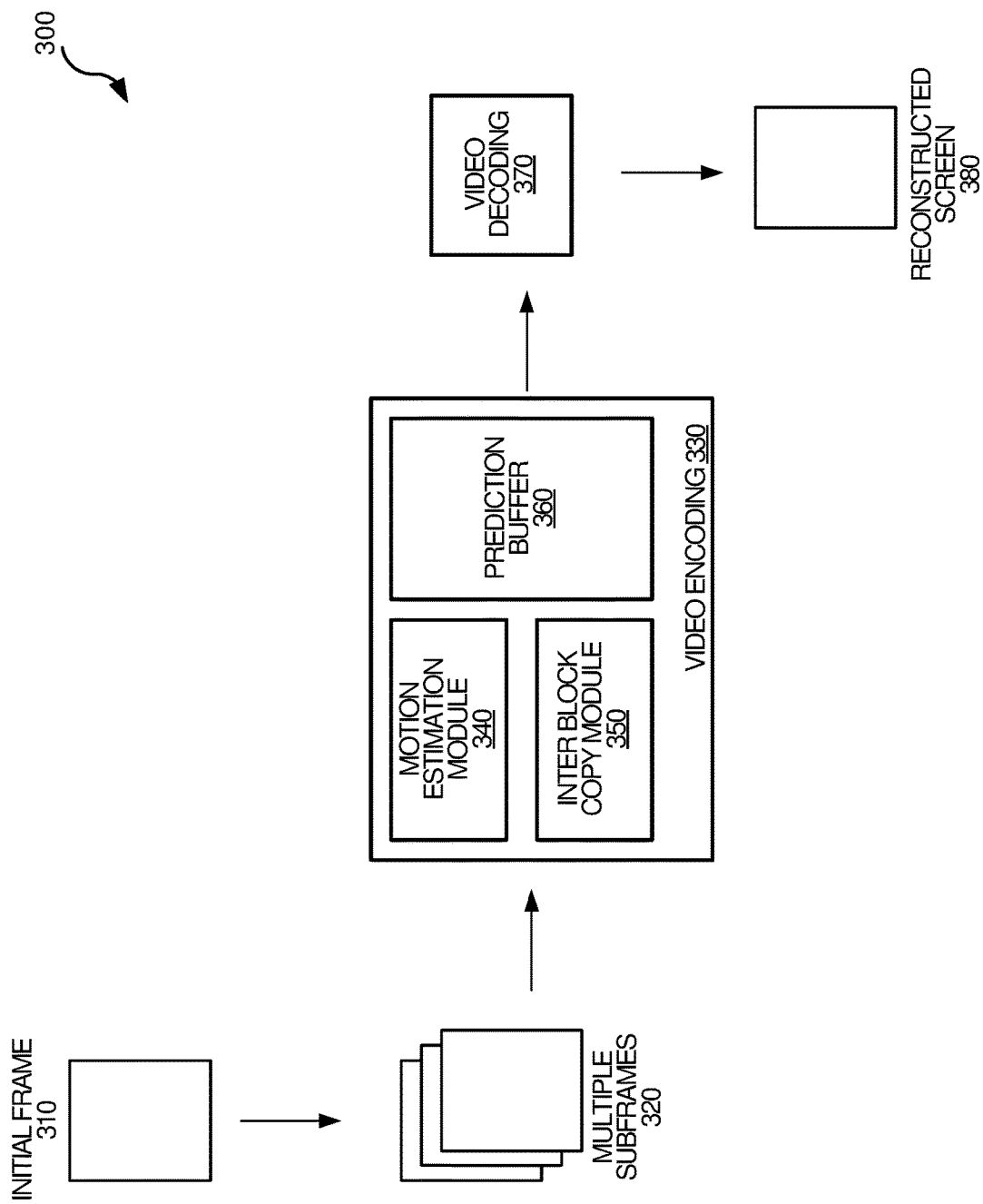
FIG. 3 illustrates how an initial frame can be processed by a video encoder in one or more embodiments of the present technology.

FIG. 3 illustrates how an initial frame 310 can be processed by a video encoder in one or more embodiments of the present technology. In the embodiments illustrated in FIG. 3, multiple subframes 320 can be created from initial frame 310. These subframes may include only a portion or subset of the data within the initial frame. For example, a first subframe can be created that includes only a first portion of the initial frame by zeroing data after an identified point within the frame. Subsequent frames can include additional data. This creates an ordered sequence of multiple subsequent frames can be created that each include successively more of initial frame 310 than the previous subframe until a final subframe is reached that represents all of the initial frame. FIG. 4 illustrates an example of an example of an initial frame 410 being divided into multiple subframes 420A-420E according to one or more embodiments of the present technology. For example, as illustrated in FIG. 4, the top fifth of initial frame 410 may be kept in the first subframe 420A. Then, each subsequent subframe may include an additional fifth of initial frame 310 until all of the data is included.

Once the initial frame has been divided into smaller area, video encoding module 330 can encode these subframes or smaller areas independently as if these multiple subframes were independent frames. As a result of the creation of the multiple subframes 320 from initial from 310, an inter frame prediction encoding technique can then be applied to simulate intra frame block copy within the initial frame. In accordance with various embodiments, video encoding module 330 can include a motion estimation module 340, inter block copy module 350, prediction buffer 360, and/or other components. These components can divide the first subframe into macroblocks and then creating a motion vector by applying a block matching algorithm to the multiple subsequent subframes. In addition, a prediction error can be calculated between any matching blocks identified by the block matching algorithm.

Since initial part of the source frame has been encoded in the initial frame, and its reconstructed picture has been stored in prediction buffer 360, the new portion of the source frame in subframes can be encoded using inter frame prediction. This simulates the intra block copy in HEVC SCC. As a result, some embodiments significantly reduce the overall size of the whole frame. The operations performed by the encoder can vary depending on compression format (e.g., HEVC format, Windows Media Video format, VC-1 format, MPEG-x format, and the like).

When encoding the initial frame, video encoding module 330 can know which portion of the input frame is from the original source frame. For example, in the case described in FIG. 4, only the first one fifth frame is from the original source frame. When working on this area, video encoding module 330 can act as normal video encoder. For the rest of picture, some embodiments may spend zero bits on it, since this part of picture can be either not displayed or only displayed as grey area. Note that to be compliant with some coding standards, such as H.264 or H.265, video encoding module 330 can encode the rest of the part of the picture even it might not be display finally. To do this with the least bits, some embodiments of video encoding module 330 can encode this area with no residual data, only bits for prediction are encoded to comply with standard.

After encoding this area with only bits for prediction modes, artifacts may appear in the decoded pictures. Some embodiments may grey out this area. To do this, some embodiments of video encoding module 330 can encode the frame into two slices. The first slice may include only the part to be displayed finally, and the second slice may include the rest part which is to be grey out.

Similarly, when encoding subframes, video encoding module 330 can track multiple different areas or segments. For example, some embodiments may track three areas: 1) the areas that have already encoded in previous subframes (Area A), 2) the areas that are newly involved (Area B); and 3) area C representing the rest of picture. When encoding Area A, since the area is identical to part the part of the frame already encoded, video encoding module 330 can encode macroblocks in skip mode. For Area B, video encoding module can encode the area as normal P frame (with both inter and intra frame prediction). For Area C, some embodiments may use only prediction mode for encoding to comply with a desired standard. Similarly, the frame can be encoded into two slices in various embodiments. The first slice can include Area A and Area B, and Area C can form the second slice. Some embodiments may apply global motion search or hash based motion search to encode these subframes.

The output of the encoding device can be transmitted to a decoder (e.g., on a different client). Since the output is compliant with the encoding standard being used, the decoder operation need not be changed and can process the channel output from the video encoding module to generate reconstructed screen 380. Since initial frame 310 was divided into smaller areas in multiple subframes 320, the decoding by video decoder may progressively present reconstructed screen 380 as the data is processed. However, some embodiments, allow for an indicator or signaling to be used so that decoder 370 may only present reconstructed screen 380 upon completion of the processing of all of multiple subframes 320.

Figure 5:
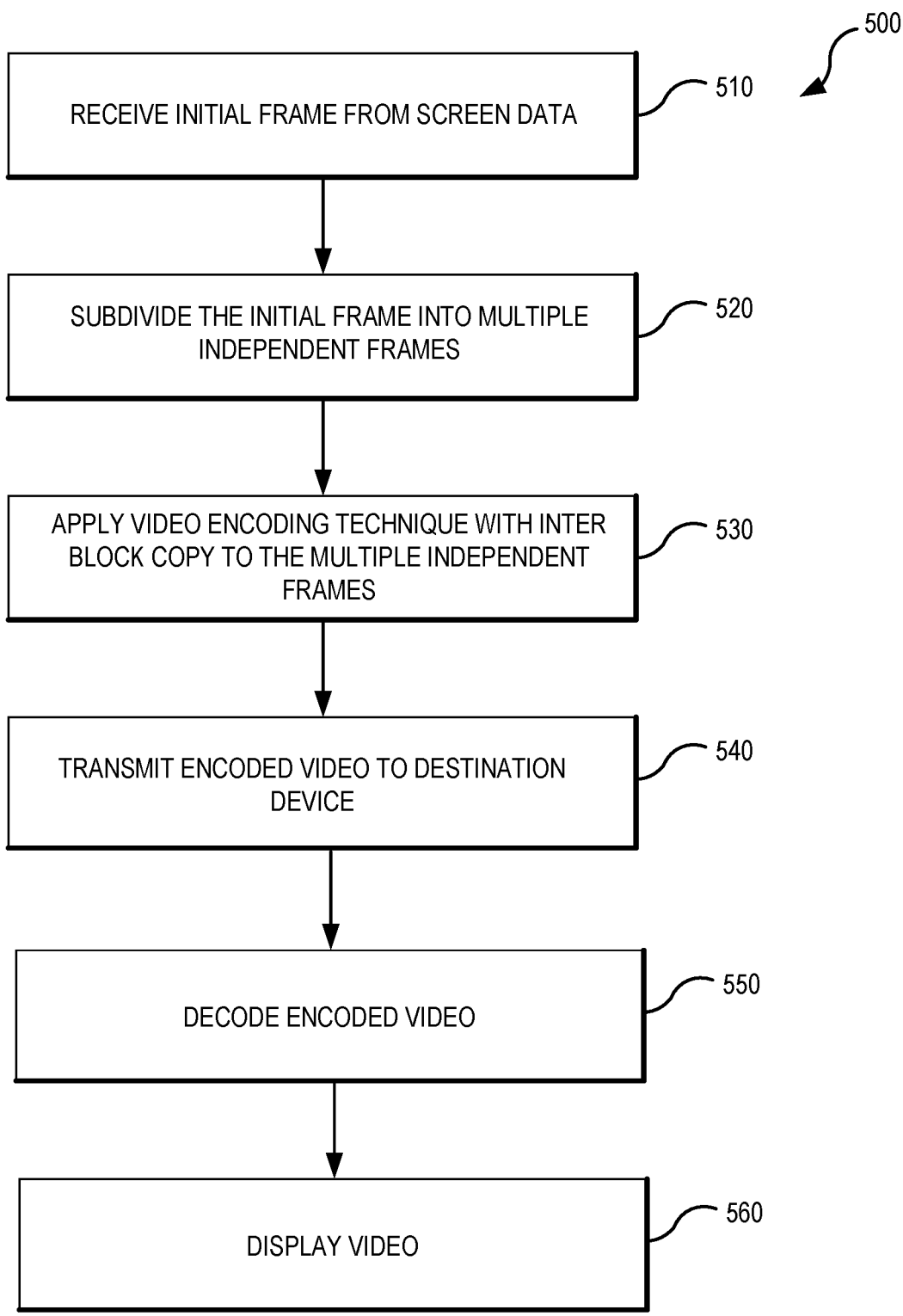
FIG. 5 is a flowchart illustrating an example of a set of operations for processing video associated with screen data in accordance with some embodiments of the present technology.

FIG. 5 is a flowchart illustrating an example of a set of operations 500 for processing video associated with screen data in accordance with some embodiments of the present technology. As illustrated in FIG. 5, receiving operation 510 can receive an initial frame of a video source representing screen data. The initial frame can be encoded using intra frame prediction techniques (e.g., creating an I-Frame). Division operation 520, can subdivide the initial frame into multiple independent frames that includes a subset of the data within the initial frame. Using a partial source frame is optional and may or may not be used by various embodiments. Encoding operation 530, can apply various encoding techniques (e.g., inter frame prediction) to the multiple independent frames thereby effectively simulating intra block copy of the initial frame without changing any of the underlying compression algorithms and/or codecs. In some embodiments encoding operation 530 can encode the subframes as P-frames.

Transmission operation 540 transmits the encoded video to a destination (e.g., a client device, storage device, etc.). The first frame transmitted to the destination device will be smaller than the initial frame since the first frame transmitted can include only a portion of the data. In addition, the encoded multiple subframes of the initial fame will also be smaller since compression techniques have been applied. Decoding operation 550 can then decode the encoded video which display operation 560 can cause to be presented on a display.

Figure 6:
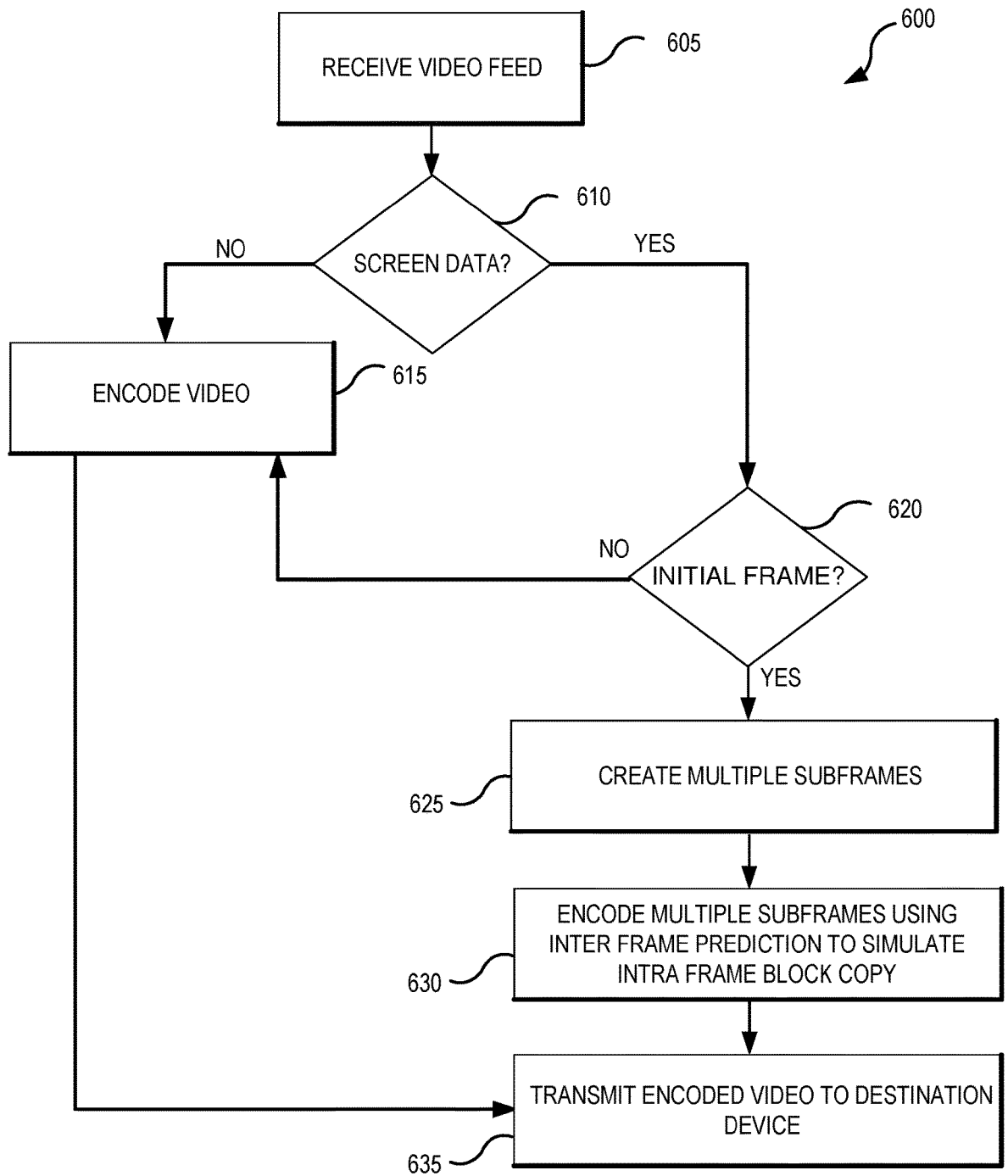
FIG. 6 is a flowchart illustrating an example of a set of operations for processing video according to various embodiments of the present technology.

FIG. 6 is a flowchart illustrating an example of a set of operations 600 for processing video according to various embodiments of the present technology. As illustrated in FIG. 6, receiving operation 605 receives video. The video may originate from a real-time communication application allowing users to interact while sharing a desktop or portion of a screen, interact via chat windows, see live video capture via a camera on the user's devices, and the like. Determination operation 610 can determine whether the video feed is that of screen data. This can be helpful as many video encoders used in video based screen sharing application were originally designed for natural images, and not for screen data. As a result, encoding screen data is not efficient on most of the popular video encoder (e.g., H.264, H.265 vp9, etc.). When determination operation 610 determines that the video feed is not representing screen data, determination operation 610 branches encoding operation 615 where traditional encoding techniques can be applied.

When determination operation 610 determines that the video feed is representing screen data, determination operation 610 branches to initial frame identification operation 620. Initial frame identification operation 620 may use various techniques to identify the initial frame. Examples of these techniques can include counters, size measurements, packet headers, and the like. When initial frame identification operation 620 determines that the current frame is not the first from the video feed, initial frame identification operation 620 branches to encoding operation 615. When initial frame identification operation 620 determines that the current frame is the first from the video feed, initial frame identification operation 620 branches to creation operation 625, where multiple subframes can be created. The multiple subframes may only include a portion of the initial frame.

Encoding operation 630 can encode the multiple subframes using inter frame prediction to simulate intra frame block copy. As the encoding is completed, transmission operation 635 can transmit the encoded video data to a destination device.

FIG. 7 illustrates computing system 710, which is representative of any system or collection of systems in which the various applications, services, scenarios, and processes disclosed herein may be implemented. For example, computing system 710 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 710 may be implemented as a single apparatus, system, or device or may be implemented in a distributed manner as multiple apparatuses, systems, or devices. Computing system 710 includes, but is not limited to, processing system 720, storage system 730, software 740, applications for process 750, communication interface system 760, and user interface system 770. Processing system 720 is operatively coupled with storage system 730, communication interface system 760, and an optional user interface system 770.

Processing system 720 loads and executes software 740 from storage system 730. When executed by processing system 720 for deployment of scope-based certificates in multi-tenant cloud-based content and collaboration environments, software 740 directs processing system 720 to operate as described herein for at least the various processes, operational scenarios, and sequences discussed in the foregoing implementations. Computing system 710 may optionally include additional devices, features, or functionality not discussed for purposes of brevity.

Referring still to FIG. 7, processing system 720 may comprise a micro-processor and other circuitry that retrieves and executes software 740 from storage system 730. Processing system 720 may be implemented within a single processing device, but may also be distributed across multiple processing devices or sub-systems that cooperate in executing program instructions. Examples of processing system 720 include general purpose central processing units, application specific processors, and logic devices, as well as any other type of processing device, combinations, or variations thereof.

Storage system 730 may comprise any computer readable storage media readable by processing system 720 and capable of storing software 740. Storage system 730 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 730 may also include computer readable communication media over which at least some of software 740 may be communicated internally or externally. Storage system 730 may be implemented as a single storage device, but may also be implemented across multiple storage devices or sub-systems co-located or distributed relative to each other. Storage system 730 may comprise additional elements, such as a controller, capable of communicating with processing system 720 or possibly other systems.

Software 740 may be implemented in program instructions and among other functions may, when executed by processing system 720, direct processing system 720 to operate as described with respect to the various operational scenarios, sequences, and processes illustrated herein. For example, software 740 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 740 may include additional processes, programs, or components, such as operating system software, virtual machine software, or application software. Software 740 may also comprise firmware or some other form of machine-readable processing instructions executable by processing system 720.

In general, software 740 may, when loaded into processing system 720 and executed, transform a suitable apparatus, system, or device (of which computing system 710 is representative) overall from a general-purpose computing system into a special-purpose computing system. Indeed, encoding software on storage system 730 may transform the physical structure of storage system 730. The specific transformation of the physical structure may depend on various factors in different implementations of this description.

Examples of such factors may include, but are not limited to, the technology used to implement the storage media of storage system 730 and whether the computer-storage media are characterized as primary or secondary storage, as well as other factors.

For example, if the computer readable storage media are implemented as semiconductor-based memory, software 740 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

In general, process 750 can be hosted in the cloud as a service, distributed across computing devices between the various endpoints, hosted as a feature of a cloud enabled information creation and editing solution. Communication interface system 760 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 770 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 770. In some cases, the input and output devices may be combined in a single device, such as a display capable of displaying images and receiving touch gestures. The aforementioned user input and output devices are well known in the art and need not be discussed at length here. In some cases, the user interface system 770 may be omitted when the computing system 710 is implemented as one or more server computers such as, for example, blade servers, rack servers, or any other type of computing server system (or collection thereof).

User interface system 770 may also include associated user interface software executable by processing system 720 in support of the various user input and output devices discussed above. Separately or in conjunction with each other and other hardware and software elements, the user interface software and user interface devices may support a graphical user interface, a natural user interface, an artificial intelligence agent capable of assisting with various automation operations (e.g. an enhanced version of Microsoft's Cortana assistant, Amazon's Alexa, or Apple's Siri, Google's Assistant, etc.), or any other type of user interface, in which a user interface to a productivity application may be presented.

Communication between computing system 710 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A device comprising:
    a processor;
    a memory in communication with the processor, the memory comprising executable instructions that, when executed by the processor, cause the processor to control the device to perform functions of:
    retrieving an initial frame of a video signal;
    creating, based on the received initial frame, a plurality of frames comprising first and second frames, the first frame comprising a first portion of the initial frame and the second frame comprising the first portion and a second portion of the initial frame;
    encoding the first frame; and
    encoding the second frame via inter-frame prediction using the first frame.

2. The device of claim 1, wherein:
    the plurality of frames further comprises a third frame comprising the first and second portions and a third portion of the initial frame, and
    the instructions, when executed by the processor, further cause the processor to control the device to perform a function of encoding the third frame via inter-frame prediction using the second frame.

3. The device of claim 1, wherein, for creating the plurality of frames, the instructions, when executed by the processor, further cause the processor to control the device to perform a functions of:
dividing the initial frame into a plurality of portions including the first and second portions; and
creating, based on the initial frame, the plurality of frames successively such that each successively created frame includes successively more portions of the plurality of portions of the initial frame, the plurality of frames comprising the first and second frames and a final frame including all of the plurality of portions of the initial frame.

4. The device of claim 3, wherein the instructions, when executed by the processor, further cause the processor to control the device to perform a function of selecting a number of the plurality of portions based on memory resource availability, processing resource availability or network bandwidth availability.

5. The device of claim 1, wherein, for creating the first frame, the instructions, when executed by the processor, further cause the processor to control the device to perform a function of replacing data of the initial frame not included in the first portion with zeros.

6. The device of claim 1, wherein:
for encoding the first frame, the instructions, when executed by the processor, further cause the processor to control the device to perform a function of dividing the first frame into a plurality of macroblocks; and
for encoding the second frame, the instructions, when executed by the processor, further cause the processor to control the device to perform functions of applying a block matching algorithm to the second frame to create a motion vector.

7. The device of claim 6, wherein the instructions, when executed by the processor, further cause the processor to control the device to perform a function of generating a prediction error between a plurality of matching blocks identified by the block matching algorithm.

8. The device of claim 1, wherein, for encoding the first and second frames, the instructions, when executed by the processor, further cause the processor to control the device to perform a function of encoding, using a H.264 or H.265 compliant codec, the first and second frames.

9. The device of claim 1, wherein the video signal comprises video data transmitted between the device and a remote device for screen sharing.

10. A method of encoding a video signal, comprising:
retrieving an initial frame of a video signal;
creating, based on the received initial frame, a plurality of frames comprising first and second frames, the first frame comprising a first portion of the initial frame and the second frame comprising the first portion and a second portion of the initial frame;
encoding the first frame; and
encoding the second frame via inter-frame prediction using the first frame.

11. The method of claim 10, wherein:
the plurality of frames further comprises a third frame comprising the first and second portions and a third portion of the initial frame, and
the method further comprises encoding the third frame via inter-frame prediction using the second frame.

12. The method of claim 10, wherein creating the plurality of frames comprises:
dividing the initial frame into a plurality of portions including the first and second portions; and
creating, based on the initial frame, the plurality of frames successively such that each successively created frame includes successively more portions of the plurality of portions of the initial frame, the plurality of frames comprising the first and second frames and a final frame including all of the plurality of portions of the initial frame.

13. The method of claim 12, further comprising selecting a number of the plurality of portions based on memory resource availability, processing resource availability or network bandwidth availability.

14. The method of claim 10, wherein creating the first frame comprises replacing data of the initial frame not included in the first portion with zeros.

15. The method of claim 10, wherein:
encoding the first frame comprises dividing the first frame into a plurality of macroblocks; and
encoding the second frame comprises applying a block matching algorithm to the second frame to create a motion vector.

16. The method of claim 15, further comprising generating a prediction error between a plurality of matching blocks identified by the block matching algorithm.

17. The method of claim 10, wherein encoding the first and second frames comprises encoding, using a H.264 or H.265 compliant codec, the first and second frames.

18. The method of claim 10, wherein the video signal comprises video data transmitted between the device and a remote device for screen sharing.

19. A non-transitory computer readable medium containing instructions which, when executed by a processor, cause a computer to perform functions of:
retrieving an initial frame of a video signal;
creating, based on the received initial frame, a plurality of frames comprising first and second frames, the first frame comprising a first portion of the initial frame and the second frame comprising the first portion and a second portion of the initial frame;
encoding the first frame; and
encoding the second frame via inter-frame prediction using the first frame.

20. The non-transitory computer readable medium of claim 19, wherein:
the plurality of frames further comprises a third frame comprising the first and second portions and a third portion of the initial frame, and
the instructions, when executed by the processor, further cause the processor to control the device to perform a function of encoding the third frame via inter-frame prediction using the second frame.

* * * * *